United States Patent
Herbault et al.

(10) Patent No.: US 9,643,628 B2
(45) Date of Patent: May 9, 2017

(54) CONVERTIBLE TRANSPORT TROLLEY HAVING A PAIR OF FOLD-AWAY LEGS AND SIMULTANEOUSLY FOLD-AWAY WHEELS

(71) Applicants: PEUGEOT CITROEN AUTOMOBILES SA, Velizy Villacoublay (FR); Patrick Herbault, La Garenne Colombes (FR)

(72) Inventors: Patrick Herbault, La Garenne Colombes (FR); Frédéric Marques, Sucy en Brie (FR); Fabien Saulnier, Le Kremlin Bicêtre (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 89 days.

(21) Appl. No.: 14/382,268

(22) PCT Filed: Feb. 27, 2013

(86) PCT No.: PCT/EP2013/053956
§ 371 (c)(1),
(2) Date: Nov. 12, 2014

(87) PCT Pub. No.: WO2013/127873
PCT Pub. Date: Sep. 6, 2013

(65) Prior Publication Data
US 2015/0091264 A1    Apr. 2, 2015

(30) Foreign Application Priority Data
Mar. 1, 2012   (FR) .................................... 12 51885

(51) Int. Cl.
*B62B 1/12*   (2006.01)
*B62B 5/00*   (2006.01)
(Continued)

(52) U.S. Cl.
CPC ................ *B62B 1/12* (2013.01); *B62B 5/003* (2013.01); *B62B 5/067* (2013.01); *B62B 5/026* (2013.01);
(Continued)

(58) Field of Classification Search
CPC .. B62B 2205/12; B62B 1/12; B62B 2205/003
(Continued)

(56) References Cited

U.S. PATENT DOCUMENTS 3,489,426 A * 1/1970 Bond ..................... A63B 55/60
280/40
3,659,867 A * 5/1972 Curry ....................... B62B 1/12
280/40
(Continued)

FOREIGN PATENT DOCUMENTS

FR    1058257    3/1954
FR    2681827    4/1993
(Continued)

OTHER PUBLICATIONS

International Search Report of corresponding application PCT/EP2013/053956 dated Apr. 5, 2013.
(Continued)

*Primary Examiner* — Emma K Frick
(74) *Attorney, Agent, or Firm* — Polster, Lieder, Woodruff & Lucchesi, LC (57) ABSTRACT

A transport trolley (CT) comprises: a pair of legs (J1) each having a lower end to which there is coupled a plate (PT1) on which at least one wheel (R1) is mounted so as to rotate in a transverse direction, first load supporting means (S1) coupled to the lower ends of the legs (J1), first coupling means (MC1) on which the lower ends of the legs (J1) are mounted so as to rotate in the transverse direction such that they can move from a folded-out position to a folded-away
(Continued)

position, and on which the plates (PT1) are mounted so as to rotate such that wheels (R1) thereof can pivot and move from a folded-out position to a folded-away position approximately parallel to the folded-away legs (J1), and second coupling means (MC2) designed to force the legs (J1) and the wheels (R1) to be substantially simultaneously either in their folded-away position or in their folded-out position.

14 Claims, 8 Drawing Sheets

(51) Int. Cl.
    *B62B 5/06*     (2006.01)
    *B62B 5/02*     (2006.01)

(52) U.S. Cl.
    CPC ....... *B62B 2202/26* (2013.01); *B62B 2203/20* (2013.01); *B62B 2205/003* (2013.01); *B62B 2205/12* (2013.01); *B62B 2205/33* (2013.01)

(58) Field of Classification Search
    USPC .......................................... 280/38, 645, 646
    See application file for complete search history.

(56) References Cited

U.S. PATENT DOCUMENTS

| | | | |
|---|---|---|---|
| 4,274,644 A | | 6/1981 | Taylor |
| 4,289,326 A | * | 9/1981 | Hawkes ................ B62B 1/047 248/171 |
| 4,294,463 A | * | 10/1981 | Kotani .................. B62B 1/12 224/257 |
| 5,348,325 A | * | 9/1994 | Abrams ................ B62B 1/12 280/40 |
| 5,439,239 A | * | 8/1995 | Su ....................... B62B 1/12 280/40 |
| 5,468,005 A | * | 11/1995 | Yang .................... B62B 1/12 280/40 |
| 5,803,471 A | * | 9/1998 | DeMars ................ B62B 1/125 280/40 |
| 5,984,327 A | * | 11/1999 | Hsieh ................ A45C 13/385 280/38 |
| 6,053,514 A | * | 4/2000 | Su ....................... B62B 1/12 280/40 |
| 6,386,558 B1 | * | 5/2002 | Chang .................. B62B 1/125 280/40 |
| 6,425,599 B1 | * | 7/2002 | Tsai ..................... B62B 1/125 280/40 |
| RE38,436 E | * | 2/2004 | Su ....................... B62B 1/12 280/40 |
| 7,097,183 B1 | * | 8/2006 | Su ....................... B62B 1/12 280/40 |
| 7,140,635 B2 | * | 11/2006 | Johnson ................ B62B 1/12 280/38 |
| 7,387,306 B2 | * | 6/2008 | Zimmer ................ B62B 1/125 280/40 |
| 7,641,217 B2 | * | 1/2010 | Yoo ..................... A61G 5/08 180/208 |
| 7,784,816 B2 | * | 8/2010 | Jian ..................... B62B 3/02 280/38 |
| 8,465,029 B2 | * | 6/2013 | Yang .................... B62B 1/12 280/47.27 |
| 8,602,444 B2 | * | 12/2013 | Chang .................. B62B 1/12 280/651 |
| 8,641,059 B2 | * | 2/2014 | Khodor ................ B62B 1/12 280/47.28 |
| 9,150,233 B2 | * | 10/2015 | Su ....................... B62B 3/022 |
| 9,199,655 B1 | * | 12/2015 | Su ....................... B62B 1/125 |
| 2002/0180184 A1 | * | 12/2002 | Chang .................. B62B 1/125 280/652 |
| 2010/0066057 A1 | * | 3/2010 | Jian ..................... B62B 3/02 280/639 |
| 2010/0140889 A1 | | 6/2010 | Chang |
| 2014/0306428 A1 | * | 10/2014 | Herbault ............... B62B 7/08 280/647 |

FOREIGN PATENT DOCUMENTS

| | | |
|---|---|---|
| FR | 2794417 | 12/2000 |
| JP | 52119662 | 9/1977 |
| WO | 2011097419 A1 | 8/2011 |
| WO | 2012049389 A1 | 4/2012 |

OTHER PUBLICATIONS

Written Opinion of corresponding application PCT/EP2013/053956 dated Sep. 2, 2014.

* cited by examiner

CONVERTIBLE TRANSPORT TROLLEY HAVING A PAIR OF FOLD-AWAY LEGS AND SIMULTANEOUSLY FOLD-AWAY WHEELS

CROSS-REFERENCE TO RELATED APPLICATIONS

The present invention is the US National Stage under 35 U.S.C. §371 of International Application No. PCT/EP2013/053956, which was filed on Feb. 27, 2013 and which claims the priority to French App. No. 1251885 filed on Mar. 1, 2012, the content of which (text, drawings and claims) is incorporated herein by reference.

BACKGROUND

The invention relates to transport trolleys used for transporting loads and which can be converted in order to be stored or stowed, if necessary with their load(s).

Here "transport trolley" is understood to be a convertible system (or device), comprising a pair of approximately parallel legs, which can be rolled when pushed or pulled and is capable of supporting at least one load. Consequently, it could involve for instance a two-wheeled trolley, a shopping cart, a stroller or a modular element of a platform floor of a vehicle.

On the other hand, in the following, the word "load" designates any heavy body, no matter whether it is a person (baby, infant or adult), animal, vegetable or object.

A person skilled in the art knows that some transport trolleys of the aforementioned type comprise, on the one hand, a pair of legs with lower extremities to which are coupled respectively plates on which wheels are mounted in rotation in a transverse direction, and on the other hand, load support means which are coupled to the lower extremities of the legs.

Several solutions have been proposed in order to reduce the space occupied by these transport trolleys, in particular when they are not being used. It has been proposed to fold away their plates (and therefore their wheels) by means of a rotational movement in a vertical direction. It has also been proposed to add to the transport trolley a mechanism for converting the inclination of its first load support means into a rotational movement of its wheels by means of a simplified crossed axis gear system and/or a system which is functionally equivalent to the preceding, for instance a ramp type or connecting bar type system. A shopping cart has also been proposed, specifically in U.S. Pat. No. 6,386,558, in which the load support means are arranged in the form of a fixed frame and the plate (and therefore the wheels) can be folded away horizontally under the frame. A shopping cart has also been proposed, specifically in JP Pat. No. 52119662U, in which the upper part of the legs is removable and the legs can pivot laterally once the upper part has been removed, and in which the load support means are arranged in the form of a frame which can be folded away against the legs and on which the plates are mounted in rotation (and therefore the wheels) so that the latter can be folded away in the frame.

These trolleys are not entirely satisfactory because once folded they occupy a relatively large space and/or they require several manual operations for folding, and because in any case they cannot be folded when carrying a load, and in general once folded they cannot be used for supporting a load.

BRIEF SUMMARY

The goal of the invention is therefore to propose an alternative solution which does not have all, or some, of the aforementioned disadvantages.

For this purpose, the invention proposes a transport trolley, comprising, on the one hand, a pair of legs comprising lower extremities each coupled to a plate on which is mounted in rotation in a transverse direction at least one wheel, and, on the other hand, first load support means coupled to the lower extremities of the legs.

This transport trolley is characterized by the fact that it further comprises:
  first coupling means on which are mounted in rotation, on the one hand, the lower extremities of the legs in a transverse direction so that they can change from a straightened-out position to a folded-away position, and, on the other hand, the plates so that their wheels can pivot under load and change from a straightened-out position to a folded-away position approximately parallel to the folded-away legs, and
  second coupling means arranged to force the legs and the wheels to be approximately simultaneously either in their folded-away position, or in their straightened-out position.

The expression "under load" means not only the presence of a load on the support structure, but also under the effect of the own weight of the transport trolley.

Since the inclination of the legs and the wheels are coupled, the transport trolley can be deployed or folded away in a single operation, while giving the trolley great compactness once folded.

The transport trolley can comprise other characteristics which can be taken separately or in combination, and in particular:
  the wheels can be suitable to rotate under load according to a longitudinal axis of rotation positioned (as close as possible) to the floor, even almost in coincidence with their contact zone;
  it can comprise two feet associated respectively with the plates and arranged for stabilizing the trolley when it is stationary;
  the first load support means can be solidly connected to the feet;
  the feet can be rotatably mounted on the first coupling means so that they can change from a straightened-out position suitable for stabilization to a folded-away position approximately parallel to the folded-away legs;
  the second coupling means can be arranged to force the plates and the feet to be approximately simultaneously either in their folded-away position, or in their straightened-out position;
  in a first family of embodiments the second coupling means can comprise two crossed axis gear systems each coupled to the lower extremity of one of the legs and a small connecting rod suitable for pivoting one of the plates;
  in a second family of embodiments the second coupling means comprises a Sarrus structure coupled to the lower extremities of the legs;
  the first load support means can be arranged in the form of a plate with the general shape of a U. In this case, the first coupling means can comprise two hinges consisting each of a first part solidly connected to the lower extremity of one of the legs and a second part mounted in rotation on this first part and on which is mounted in rotation one extremity of the plate. The second coupling means can comprise two articulations comprising each of a first part mounted in rotation on the first part of one of the hinges, a second part mounted in rotation on this first part, and a third part mounted in rotation on this second part and on which are rotatably mounted one of the plates and another extremity of the plate;

Each plate can be coupled to the first coupling means via a Scott-Russel type straightening mechanism.

In a first implementation mode the first load support means can be mounted in rotation on the first coupling means so that it can change from a straightened-out position approximately perpendicular to the legs to a folded-away position approximately parallel to the folded-away legs;

the first coupling means can comprise a rigid mounting assembly on which are respectively mounted in rotation the legs, the plates and the first load support means. In this case, the second coupling means can be arranged to force the wheels and the first load support means to be approximately simultaneously either in their folded-away position, or in their straightened-out position;

in a second embodiment, the first coupling means can include at least two plates on which are respectively rotatably mounted the legs and the plates. In this case, the first load support means can be solidly connected with the plates.

In the first and second embodiments, the first load support means can be arranged in the form of two blades;

In a third embodiment, each leg can comprise two posts which, on one hand, comprise two upper extremities solidly connected respectively to a corresponding longitudinal part and two lower extremities rotatably coupled to the first coupling means, and, on the other hand, participate with this longitudinal part in defining a deformable parallelepiped in which the posts can be folded away approximately parallel to the longitudinal part;

the first coupling means can consist of two longitudinal bars on each of which are mounted in rotation in a transverse direction the lower extremities of the two posts of a legs;

the longitudinal bars can define a part at least of the first load support means;

in a variant, the longitudinal bars can each comprise a front part to which is solidly attached a part of the first load support means;

The first load support means can be rotatably mounted on the longitudinal bars so that they can move from a load receiving straightened-out position to a folded-away position approximately parallel to the folded down legs;

The second coupling means can be arranged to force the plates and the first load support means to be approximately simultaneously either in the folded-away position, or in the straightened-out position;

The first load support means can be arranged in the form of two blades;

In a variant, it can comprise second load support means coupled to the longitudinal parts and/or to some posts;

The second load support means can be coupled to the longitudinal parts via guide ways;

The guide ways can be telescopic types;

In another variant, it can comprise second load support means rotatably coupled to one of the posts of each of the legs in such manner that they can change from a straightened-out position approximately perpendicular to the legs to a folded-away position approximately parallel to the legs;

Each plate can comprise an assembly of three wheels arranged in triangle;

It can constitute a modular element of a platform floor of a vehicle.

A vehicle, possibly an automotive-type vehicle, is also disclosed which has a rear end arranged in such manner that it can receive at least one transport trolley of the aforementioned type, after the transport trolley has been configured in a folded-away storage condition.

The rear end of such a vehicle could comprise locking means suitable for immobilizing, in a selected position, each transport trolley configured in its folded-away storage position.

DESCRIPTION OF THE FIGURES

Other characteristics and advantages of the invention will become clear upon examining the following detailed description and the attached drawings, in which.

The attached drawings will serve not only to complete the invention, but to contribute to its definition, as required.

DETAILED DESCRIPTION

A transport trolley CT, with a pair of legs Jk (k=1 or 2), is capable of transporting loads and of being converted so that it can be stowed or stored, if necessary with its loads.

As will be explained below, the transport trolley can be for instance a two-wheeled trolley, a shopping cart, or a modular element of the platform floor of a vehicle.

In the following, it is assumed as a non-limiting example, that the loads are objects (or devices) or vegetables. But, the invention is not limited to these types of loads. It relates in fact to any heavy body, whether it involves a person, an animal, a vegetable or an object.

Reference is made first to FIGS. 1 to 4, describing a first non-limiting embodiment of the transport trolley CT.

As illustrated (at least partially), a transport trolley CT comprises at least a pair of legs Jk, first load support means S1, first coupling means MC1 and second coupling means MC2.

Figure 13:
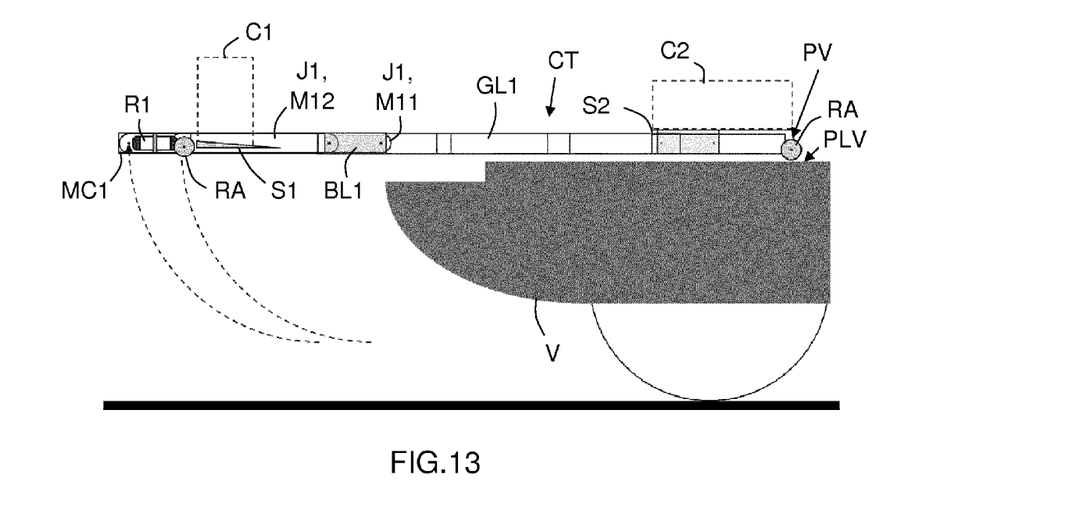
Figure 14:
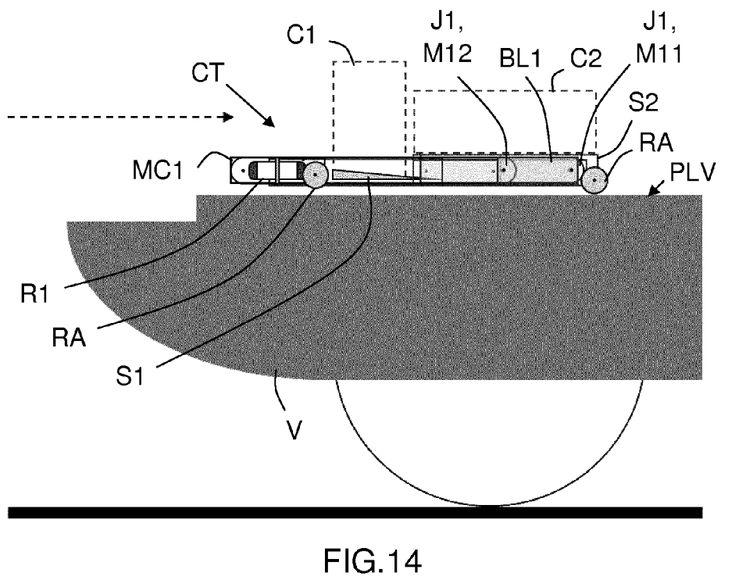

The first load support means S1 is arranged in such manner that it is supporting at least one load C1 (FIG. 13), possibly contained in a crate (or in a box or basket) with dimensions adapted if necessary to its own dimensions. It is to be noted that in the non-limiting example illustrated in FIGS. 1 to 4, the first load support means S1 is arranged in the form of two blades extending in a longitudinal direction. But this is not mandatory. The first load support means could involve a frame (if necessary equipped with rails and/or beams for rigidity) or a plate (if necessary with local cut-outs). It is to be noted that the device according to the invention may be the front or rear constituent of a foldable structure, as an example a trolley for which the load support S1 is the lower plate or a push cart, a buggy for which the load support S1 is the lower basket positioned approximately at the height of the wheels.

The two legs Jk of the single pair of legs each comprise at least one post. These two legs Jk are approximately parallel and each comprises a lower extremity to which is coupled a plate PTk on which is rotatably mounted in a transverse direction (perpendicular to the longitudinal direction or parallel to the plane of the plate) at least one wheel Rk.

If necessary, each wheel Rk can be rotated 360° about an axis perpendicular to the plane of the plate. The diameter of the wheels Rk depends on the target application. For instance, if the transport trolley CT must support relatively heavy loads and circulate over different types of terrains, it is advantageous that the diameter of the wheel be 12.5 cm. But other diameters can be envisaged.

It is to be noted that in the embodiments illustrated in FIGS. 1 to 8 and 10 to 18, each plate PTk is rotatably supporting only one wheel Rk. But this is not mandatory. In fact, each plate PTk can rotatably support several wheels Rk. It is in particular the case in the embodiment illustrated in FIG. 9, where each plate PTk is supporting a three-wheel system mounted in triangle (or star), which is particularly suitable for traveling over steps. In this case, the height of each three-wheel system, associated with a plate PTk, is a few centimeters smaller than the half-width of trolley CT (for instance 30 to 35 centimeter for a trolley CT with a width of 60 to 70 cm).

The upper extremities of the legs are for instance coupled together by a handlebar BP.

The lower extremities of legs Jk are coupled to the first load support means S1. These lower extremities of the legs Jk are rotably mounted on the first coupling means MC1 in a transverse direction in order to change from a straightened-out position (illustrated in FIGS. 1 and 2) to a folded-away position (illustrated in FIG. 4), passing through at least one intermediary position (illustrated in FIG. 3).

Figure 2:
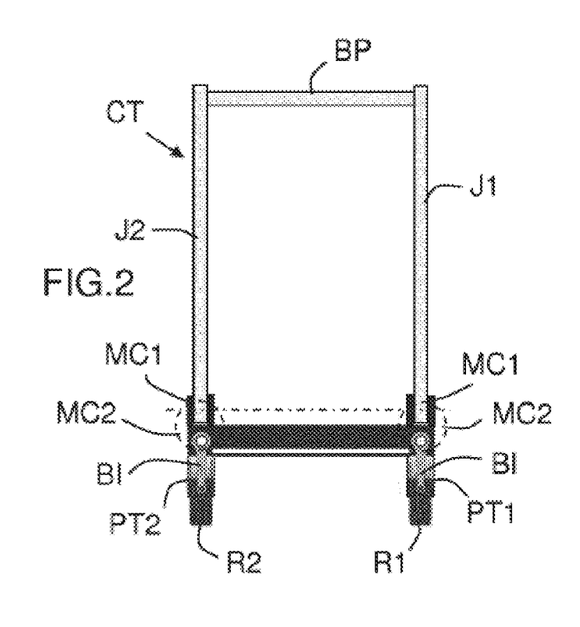
FIG. 2 illustrates in a schematic and functional manner, in a front view of the back side, the transport trolley of FIG. 1 in a deployed position.
Figure 2A:
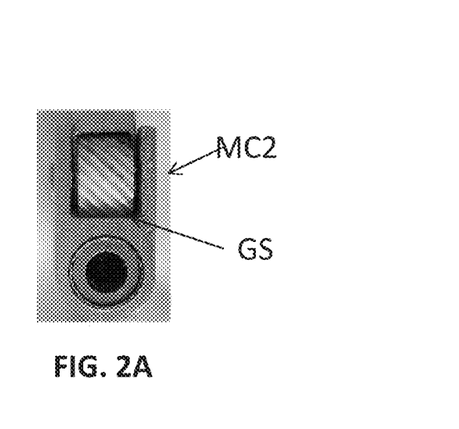
FIG. 2A is a fragmentary cross-sectional view illustrating a cross-axle gear system contained within circle MC2 of FIG. 2.
Figure 3:
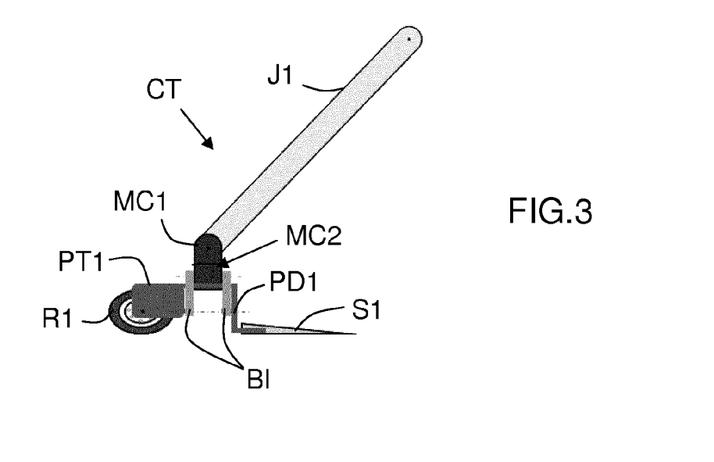
FIG. 3 illustrates in a schematic and functional manner, in a side view, the transport trolley of FIG. 1 in an intermediate stage of a folding phase.
Figure 4:
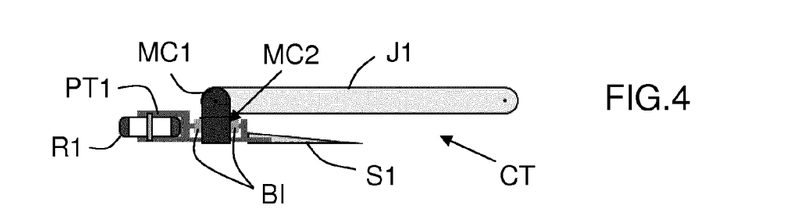
FIG. 4 illustrates in a schematic and functional manner, in a side view, the transport trolley of FIG. 1 at the end of the folding phase.

Plates PTk are also rotatably mounted on the first coupling means MC1 in order for the wheels Rk to pivot under load and change from a straightened-out position (illustrated in FIGS. 1 and 2) to a folded-away position (illustrated in FIG. 4), approximately parallel to legs Jk (after these legs (Jk) have been folded away), passing through at least one intermediary position (illustrated in FIG. 3).

It is to be noted that each plate PTk is rotatably mounted in the longitudinal direction.

It is to be noted also that the expression "under load" means here not only the presence of a load on the first load support means S1, but also under the effect of the trolley's CT own weight.

Any pivoting mechanism of wheels Rk under load, known by a person skilled in the art, can be used here. An example of such a mechanism is schematically and non-limitingly illustrated in FIGS. 16 to 18. In this example, each plate PTk, on which is rotatably mounted a wheel Rk, is solidly rotatably connected (in a longitudinal direction) to a mounting foot PF which is itself solidly rotatably connected (in a longitudinal direction), directly or indirectly to a frame CD. This makes the transport trolley CT more rigid while increasing its stability when it is in a deployed or folded-away position. By preference, wheels Rk are suitable for pivoting under load about a longitudinal rotation axis which is positioned as close as possible to the floor, almost in coincidence with their contact zone.

When the transport trolley CT is positioned on a surface (for instance a wooden floor or pavement) and pressure is applied from high to low on the legs Jk in order to fold them away towards the front or the rear, this provokes the progressive inclination of plates PTk (with their wheels Rk), because of the fact that they are mounted in rotation on the mounting feet PF, until they are approximately parallel to legs Jk. The wheels Rk are straightened out again by inverse operations. Such a mechanism, which exploits a Scott-Russel type kinetic chain, is described in detail in French Pat. No. FR1058257.

The second coupling means MC2 (only shown completely in the embodiment example of FIG. 15) is arranged for forcing the legs Jk and the wheels Rk to be approximately simultaneously either in their folded-away position, or in their straightened-out position.

At least two types of second coupling means MC2 can be envisaged. They are respectively associated with families of different embodiments.

A first type, associated with a first family grouping, in particular the examples illustrated in FIGS. 1 to 4, is related to the second coupling means MC2 which comprises two crossed axis gear systems GS (one per longitudinal side) each coupled to the lower extremity of one of the legs Jk and one of the plates PTk (and more precisely to its connecting rods BI controlling the inclination). It is apparent that each gear system forces one plate PTk to pivot when the associated leg Jk is rotated to be straightened out or folded away, and vice-versa.

According to the selected construction of the gear system, it can comprise either bevel gears when the axes of rotation are situated and concurrent in the same horizontal plane, or helical gears with crossed axes when the axes are not in the same horizontal plane, and because of this the gears are vertically superimposed. The gear system works only over a quarter of one revolution and its construction can be limited to the only sector necessary for its function.

It is to be noted that this first type is particularly suited, although not exclusively, for the aforementioned case where each plate PTk is coupled to the first coupling means MC1 via a Scott-Russel type mechanism.

Figure 15:
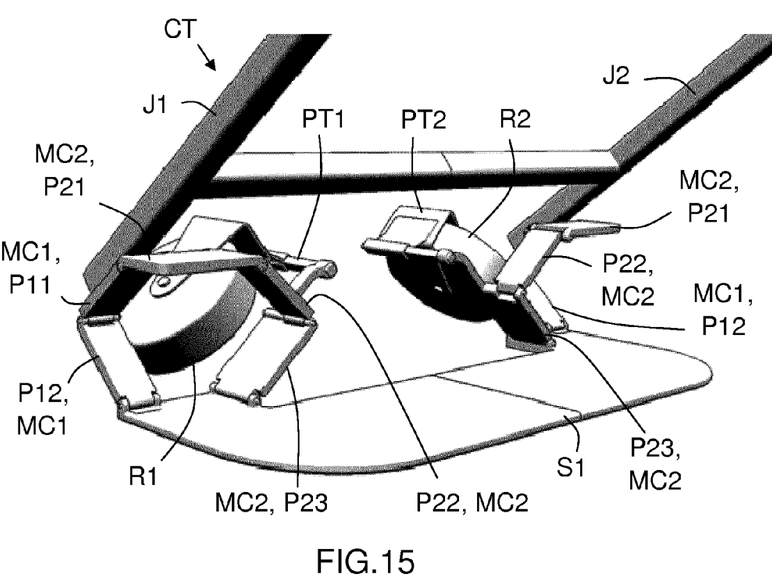
FIG. 15 illustrates in a schematic and functional manner, in perspective view, a part of a sixth example of an embodiment of the transport trolley in a partially folded down position.
Figure 16:
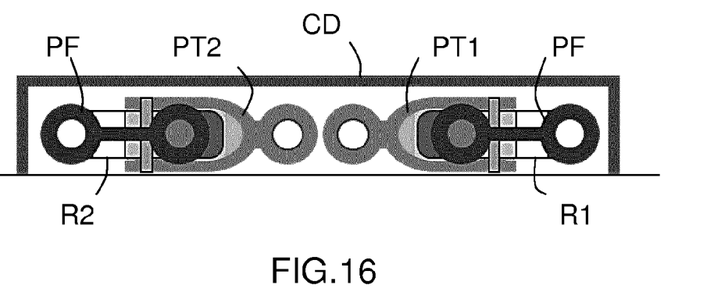
FIGS. 16 to 18 illustrate in a schematic and functional manner, in sectional views along a transverse plane, three stages of a straightening-out phase of an example of wheel assembly for a transport trolley.
Figure 17:
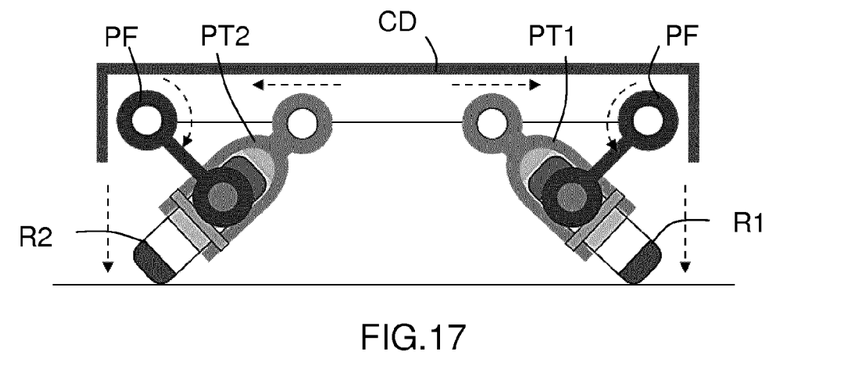
Figure 18:
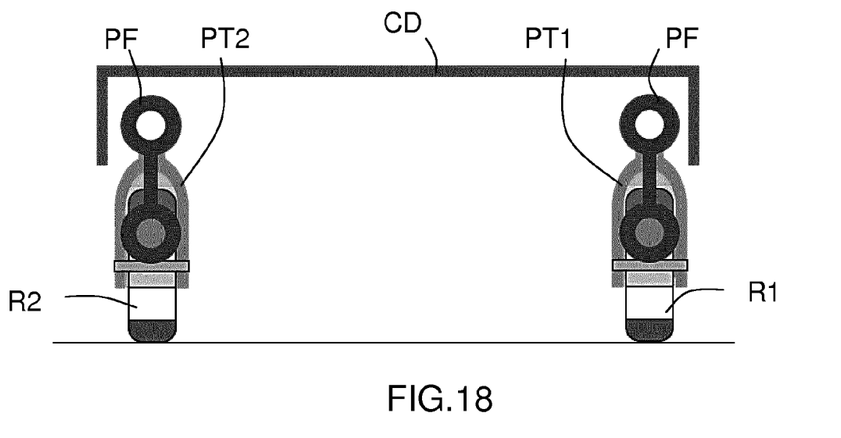

A second type, associated with a second family comprising, in particular, the example illustrated in FIG. 15, relates to the coupling means MC2 which comprises two articulations working in concert with two hinges which are part of the first coupling means MC1 in order to constitute with the latter a Sarrus structure. It is to be noted that in this non-limiting example, the first load support means S1 is arranged in the form of U shaped plate and each hinge MC1 comprises a first part P11 which is solidly connected to the lower extremity of one of the two legs Jk, and a second part P12 which is mounted in rotation on this first part P11 and on which is mounted in rotation one of the two extremities of plate S1. In this case, each articulation comprises a first part P21 which is mounted in rotation on the first part P11 of one of the two hinges MC1, a second part P22 which is mounted in rotation on this first part P21, and a third part P23 which is mounted in rotation on this second part P22 and on which are rotatably mounted one of the two plates PTk and the other extremity of plate S1. To be noted that in this structure, the second part P22 performs the function of connecting rod (BI) and the third part P23 performs the function of foot (PDk). It is to be noted also that, to balance the longitudinal forces, it is possible to complete this structure by adding their symmetric part in front, on each side and opposite the first part P11 and the second part P12.

It is apparent that with such a Sarrus structure (or an analog thereto), when the legs Jk are manipulated forward or backward, the axis of rotation of legs Jk is lowered or raised, which increases or decreases the inclination of plates PTk by the same angle (and therefore of the wheels Rk) and of the first load support means S1 and/or feet PDk and allows to change from a folded-down (or folded-away) position to a straightened-out (or deployed) position over a fourth of a revolution.

It is to be noted that if necessary the Sarrus structure can be combined with a Scott-Russel straightening-out mechanism.

It is to be noted also that no matter what family, it is very advantageous for the transport trolley CT to comprise two feet PDk associated respectively with plates PTk and arranged for stabilizing it when it is stationary. As illustrated in non-limiting manner in FIGS. 1 to 9 and 11 to 14, if necessary the first load support means S1 can be solidly connected with the feet PDk.

Feet PDk can be rotatably mounted on the first coupling means MC1 so that they can change from a straightened-out position suitable for stabilization to a folded-away position approximately parallel to the folded-away legs Jk. In this case, the second coupling means MC2 can be arranged if necessary to force plates PTk and feet PDk to be approximately simultaneously either in their folded-away position, or in their straightened-out position. But the feet PDk can also be longitudinally foldable in parallel with the inclination of the legs Jk, or even directly from their extension.

In the embodiment illustrated in FIGS. 1 to 4, and belonging to the first aforementioned family, the transport trolley CT is a two-wheeled trolley equipped with first load support means S1 which is rotatably mounted on the first coupling means MC1 so that it can change from a straightened position approximately perpendicular to the legs Jk to a folded-away position approximately parallel to the legs Jk (after the latter (Jk) have been folded away).

Figure 1:
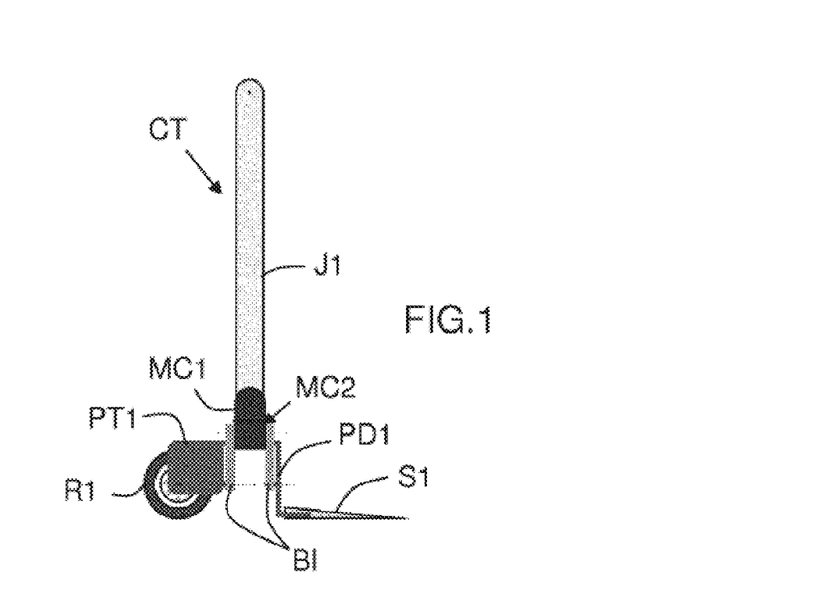
FIG. 1 illustrates in a schematic and functional manner, in a side view, a first example of an embodiment of the transport trolley according to the invention in a deployed position.

In this non-limiting example, the first coupling means MC1 comprises a rigid mounting assembly on which are respectively rotatably mounted the legs Jk, the plates PTk and the first load support means S1. The second coupling means MC2 is arranged here to force wheels Rk and plates PTk and the first load support means S1 to be approximately simultaneously either in a folded-away position (FIG. 4), or in a straightened position (FIGS. 1 and 2).

It is to be noted that the first load support means S1 is arranged here in the form of two trans-pallet type longitudinal blades, as a non-limiting example.

In a variant construction, not shown, the first coupling means MC1 could comprise at least two plates on which are respectively mounted in rotation the legs Jk and the plates PTk, and the first load support means S1 could be secured respectively and fixedly to these plates.

Figure 5:
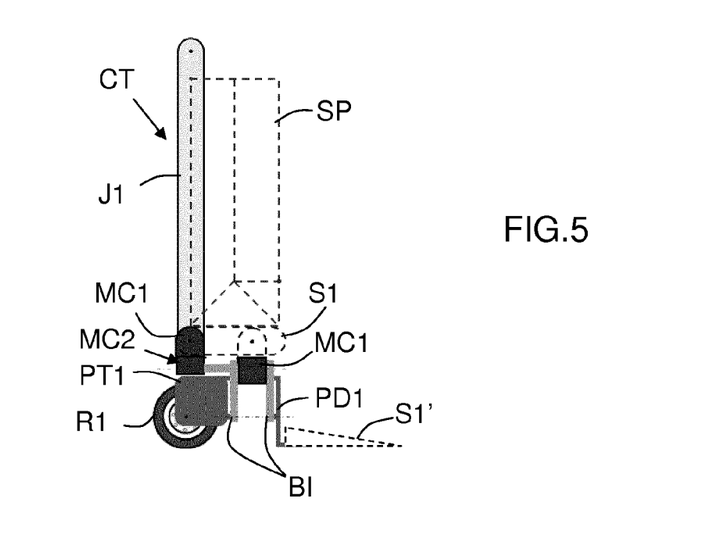
FIG. 5 illustrates in a schematic and functional manner, in a side view, a second embodiment of the transport trolley in deployed position.

In the embodiment illustrated in FIG. 5, and belonging to the first aforementioned family, the transport trolley CT is a shopping cart with a flexible load bag SP, equipped, if necessary, with a rigid bottom which in this case performs the function of first load support means S1. In order to receive this flexible bag SP, the legs Jk are offset to the back (above the wheels Rk). The lower extremities of legs Jk are rotatably mounted (in a transverse direction) on rear plates of the first coupling means MC1, while the plates PTk and the first load support means S1 are rotatably mounted (in a longitudinal direction) on two front plates of the first coupling means MC1, via connecting rods BI. In a variant, the leg Jk can actuate the first coupling means MC1 through a direct linkage in the form of connecting rods linking the lower part of leg Jk, or its extension, to the equivalent of a lower part of the leg, or its extension, positioned on the front part of the first coupling means MC1. It is to be noted that the two plates MC1 can also support the (optionally rigid) bottom S1 of the flexible bag SP or of a flexible structure having an equivalent function of a container. It is to be noted also that as an alternative or combination, as a non-limiting example, the first load support means S1 can comprise two trans-pallet type longitudinal blades S1' dedicated to load support and solidly connected to the feet PDk.

In the embodiments illustrated in FIGS. 6 to 10, and belonging to the first aforementioned family, each transport trolley CT is equipped with legs Jk which each comprise two posts Mik (i=1 or 2) offset in a longitudinal direction. Each post Mik comprises one upper extremity solidly connected to a corresponding longitudinal part PLk and a lower extremity rotatably coupled to the first coupling means MC1. The two posts Mik of each leg Jk cooperate with the corresponding longitudinal part PLk in defining a deformable parallelepiped in which the posts Mik can be folded away approximately parallel to the longitudinal part PLk.

It is apparent that once the posts Mik have been folded away parallel to the lateral parts PLk, they are integrally contained in the space defined by the vertical extension of these lateral parts PLk. The vertical direction is a direction which is perpendicular to the transverse and longitudinal directions.

In order for the two posts Mik of a leg Jk to be placed in the space defined by the vertical extension of the lateral parts PLk, and therefore one approximately parallel to the other, one of them (for instance the first M1k) can be arranged for instance in the form of a blade, while the other (for instance the second M2k) can be arranged for instance in the form of a bar equipped with a central cavity intended to house at least one part of blade M1k. In a variant, the extremities of the two posts Mik of a leg Jk can be slightly offset one relative to the other in a transverse direction.

Figure 6:
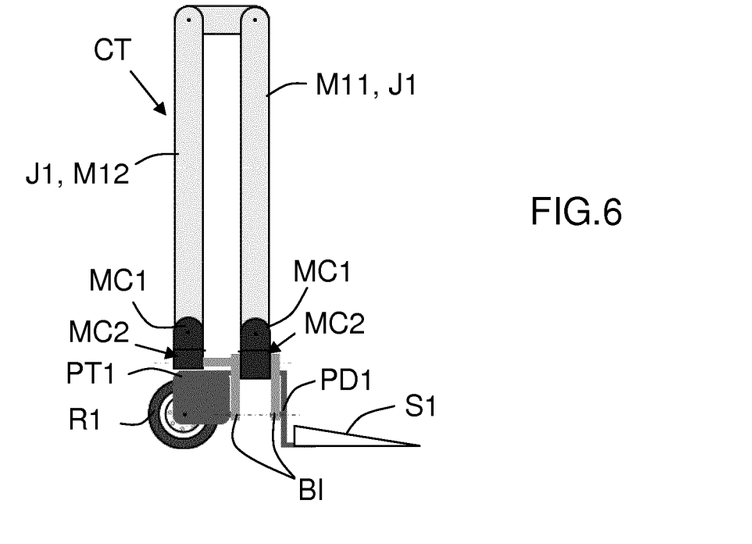
FIG. 6 illustrates in a schematic and functional manner, in a side view, a third embodiment of the transport trolley in deployed position.

In the example of FIG. 6, the transport trolley CT is a two-wheeled trolley in which the two posts Mik of each leg Jk comprise lower extremities which are respectively mounted in rotation (in a transverse direction) on the front and rear plates of the first coupling means MC1, and the plates PTk and the first load support means S1 is rotationally mounted (in a longitudinal direction) on the two front plates of the first coupling means MC1, via connecting rods BI. It is to be noted that the first load support means S1 is arranged here as a non-limiting example in the form of two trans-pallet type longitudinal blades.

Figure 7:
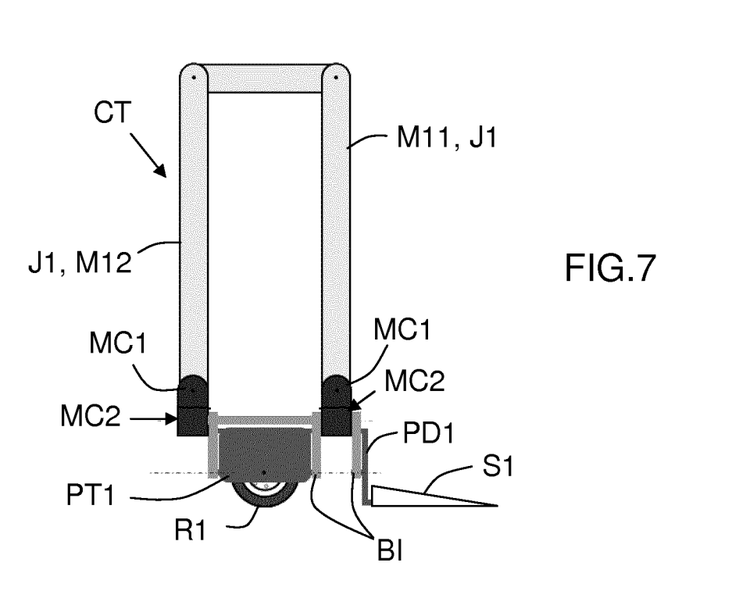
FIG. 7 illustrates in a schematic and functional manner, in a side view, a fourth embodiment of the transport trolley in deployed position.

In the example of FIG. 7, the transport trolley CT is a two-wheeled trolley in which the two posts Mik of each leg Jk comprise lower extremities which are respectively rotatably mounted (in a transverse direction) on the front and rear plates of the first coupling means MC1; the plate PTk being rotationally mounted (in a longitudinal direction) on a front plate of the first coupling means MC1, via connecting rods BI, and the first load support means S1 being rotationally mounted (in a longitudinal direction) on the two front plates of the coupling means MC1, via connecting rods BI. It is to be noted that the first load support means S1 are arranged here as a non-limiting example in the form of two trans-pallet type longitudinal blades.

Figure 8:
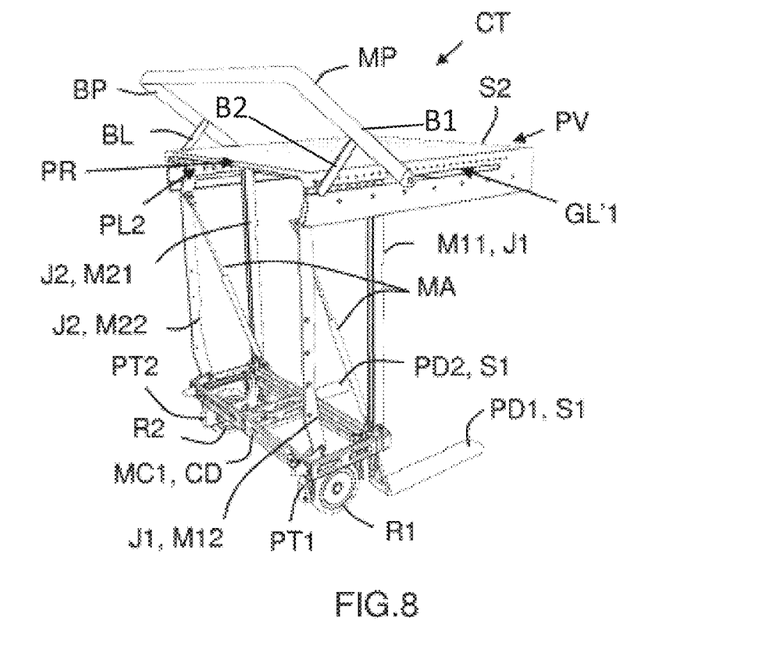
FIG. 8 illustrates in a schematic and functional manner, in a perspective view, a first variant of the transport trolley of FIG. 7 in deployed position.
Figure 9:
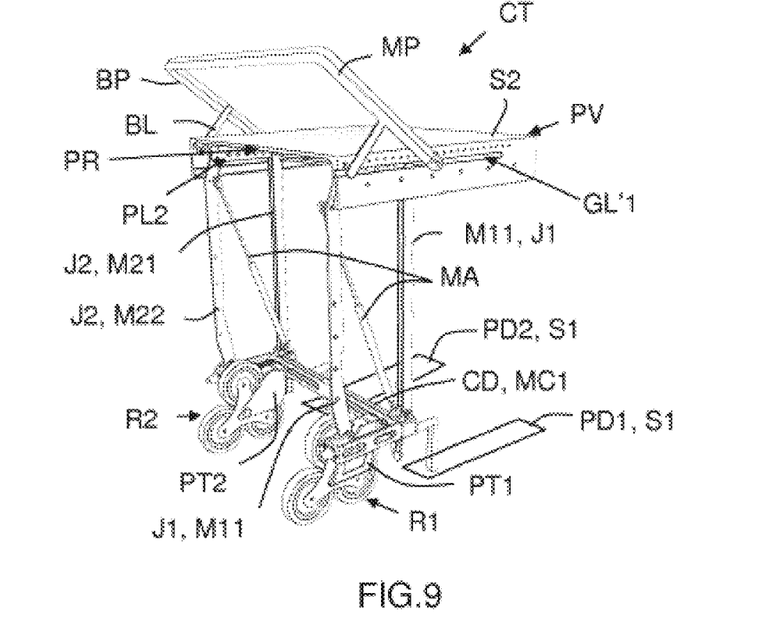
FIG. 9 illustrates in a schematic and functional manner, in a perspective view, a second variant of the transport trolley of FIG. 7 in deployed position.

In the examples of FIGS. 8 and 9, the transport trolleys CT are two-wheeled trolleys equipped with first coupling means MC1 which comprise two longitudinal bars which are part of an (approximately rectangular) frame CD and on each of which are rotationally mounted in a transverse direction the lower extremities of the two posts Mik of a leg Jk. The longitudinal bars of the first coupling means MC1 each comprise a front part to which is solidly connected a part (at least) of the first load support means S1. In addition, these longitudinal bars participate in the definition of the deformable parallelepiped.

For instance, and as illustrated in a non-limiting manner in FIGS. 8 and 9, the first load support means S1 can be rotationally mounted on the longitudinal bars of the first coupling means MC1 so that they can change from a straightened-out position for receiving loads to a folded-away position approximately parallel to legs Jk (after they have been folded away). It is to be noted that the second coupling means MC2 can also and advantageously be arranged so as to force the plates PTk and the first load support means S1 to be approximately simultaneously either in their folded-away position, or in their straightened-out position. It is also to be noted that the first load support means S1 is arranged here as a non-limiting example in the form of two trans-pallet type longitudinal blades.

It is to be noted also, as previously mentioned, that in the examples illustrated in FIGS. 1 to 9 the first load support means S1 is solidly connected to the feet PDk which are intended to stabilize the transport trolley CT when it is stationary in a deployed position. But this is not mandatory. In fact, the transport trolley CT can comprise not only the first load support means S1, but also the feet dedicated to its stabilization when stationary and which are by preference foldable. In this last variant, the first load support means S1 is installed above feet PDk.

Figure 10:
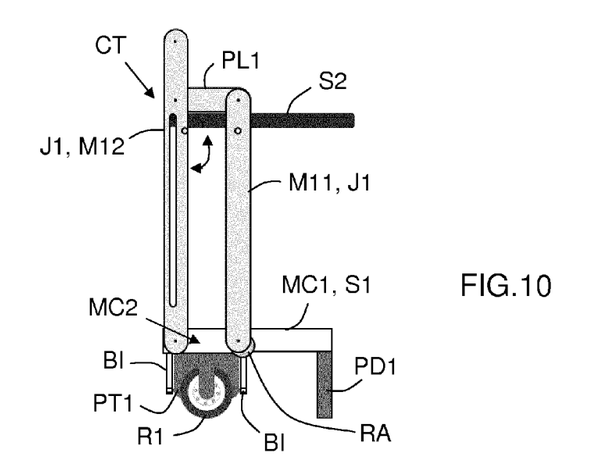
FIG. 10 illustrates in a schematic and functional manner, in a side view, a fifth embodiment of the transport trolley in deployed position.
Figure 11:
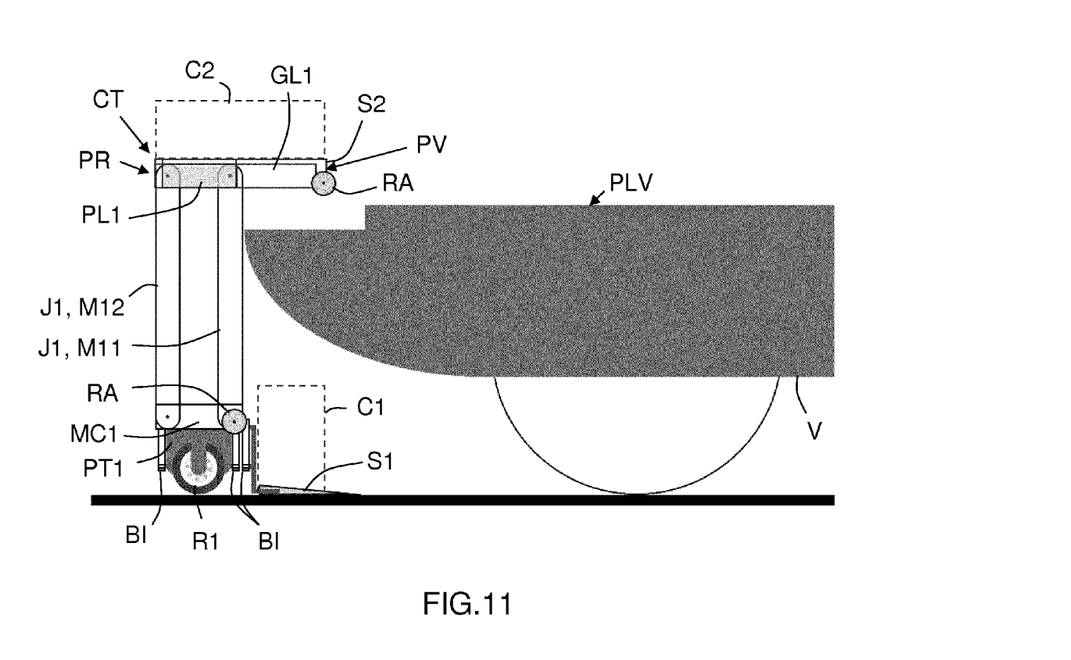
FIGS. 11 to 14 illustrate in a schematic and functional manner, in side views, the transport trolley of FIG. 7 in different stages of installation phase in the rear end of a vehicle.
Figure 12:
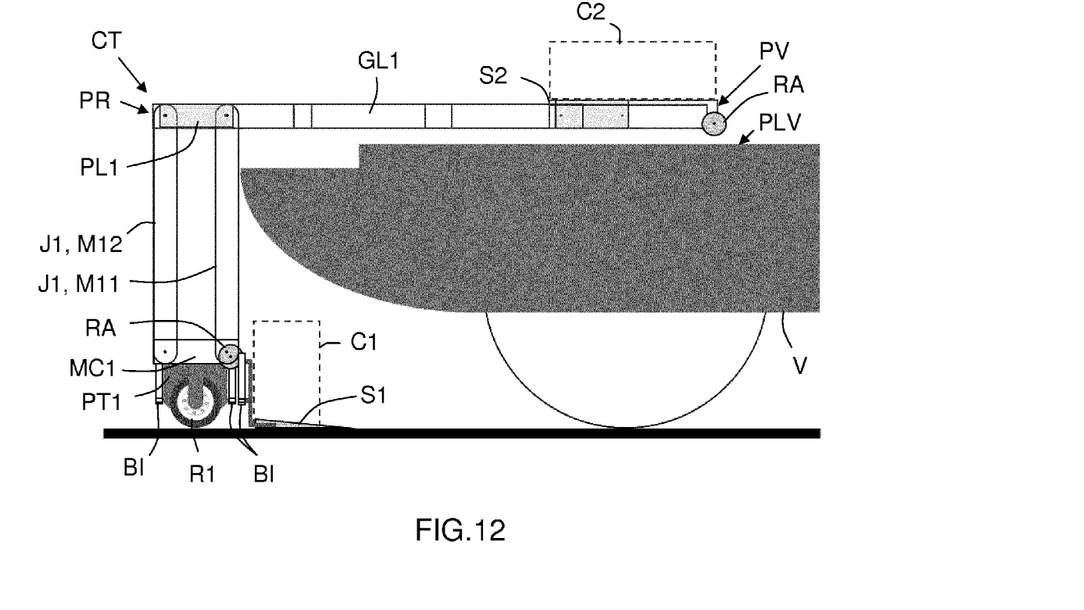

In the example of FIG. 10, the transport trolley CT is a two-wheeled trolley configurable as shopping cart and equipped with first coupling means MC1 which also comprise two longitudinal bars which could be part of an (approximately rectangular) frame, on each of which is rotatably mounted in a transverse direction the lower extremities of the two posts Mik of a leg Jk, and which define a part at least of the first load support means S1. These longitudinal bars participate in defining a deformable parallelepiped. It is to be noted that in this example the feet PDk are advantageously solidly connected to the front extremities of the longitudinal bars in order to stabilize the transport trolley CT when it is stationary in a deployed position. These feet PDk are by preference foldable.

It is also to be noted that in the examples illustrated in FIGS. 8 to 10, the transport trolleys CT also comprise second load support means S2 coupled to the longitudinal parts PLk and/or to some of the posts Mik.

More precisely, in the examples illustrated in FIGS. 8 and 9, the second load support means S2 is coupled to longitudinal parts PLk, if necessary via guide ways GLk which can be of the telescopic type, if necessary. These second load support means S2 can be for instance in the form of two bars extending in a longitudinal direction. But this is not mandatory. It can in fact involve a frame (equipped, if necessary, with rails or beams) or a plate (if necessary with cut-outs), as in the non-limiting examples of FIGS. 8 and 9. In a variant, the guide ways system GLk can first be deployed inside vehicle V, then the second load support means S2 (for instance an upper plate) with its load(s). For instance, this plate can have dimensions up to 600 mm in a transverse direction and 500 mm in a longitudinal direction. It is to be noted that these maximum dimensions require appropriate sizing of the transport trolley CT.

As illustrated in non-limiting manner in FIGS. 8 and 9, the transport trolley CT can comprise possible gripping means MP to facilitate its displacements once deployed, and its storage or retrieval once folded. The gripping means can be solidly connected (directly or indirectly) to the second load support means S2 or the longitudinal parts PLk. As illustrated, it can include a handgrip which advantageously can be folded down in order to be fully contained in the space defined by the vertical extension of the lateral parts PLk.

As illustrated as a non-limiting example, this handgrip MP can comprise a transverse handlebar BP, two first bars B1 and two second bars B2. Each first bar B1 comprises a first extremity slidably mounted in an opening (or guide way) GL'k which is defined in one of the lateral parts PLk or in the plate of the second load support means S2 (as illustrated) and a second extremity solidly connected to one of the two extremities opposite to the handlebar BP. Each second bar B2 comprises a first extremity rotatably coupled to an intermediary part of one of the first bars B1 and a second extremity rotatably coupled to one of the longitudinal parts PLk or to the plate of the second load support means S2 (as illustrated).

In order to fold down such a handgrip MP, the handlebar BP is pushed towards the front part PV, while applying pressure from high to low, in order to make the first extremities of the first bars B1 slide in the guide ways GL'k. The inverse operation must be performed in order to fold out again this handgrip MP.

It is to be noted that if necessary the handgrip MP can be coupled to a locking mechanism intended at least to maintain it in the straightened-out position.

It is to be noted also that if necessary the handgrip MP, and in particular its handlebar BP, can be removable, for instance in order to facilitate the installation of another transport trolley at the side of its own transport trolley, in particular in a vehicle V.

It is to be noted also that if necessary the handgrip MP can affect the locked/unlocked status of at least some of the locking means present.

In the example of FIG. 10, the second load support means S2 is rotatably mounted in a transverse direction on the two rear posts M2k so that they can be placed either in a folded-away position between the rear posts M2k, or placed in straightened-out position approximately perpendicular to the rear posts M2k in order to support at least one load.

It is to be noted that a transport trolley CT, according to the invention, can be introduced and installed in a vehicle V with or without its load. In the example illustrated in FIGS. 11 to 15, the transport trolley CT (similar to the transport trolley illustrated in FIG. 8) is introduced and installed in a vehicle V with a first load C1 and a second load C2 placed respectively on its first load support means S1 and second load support means S2. But it can be installed in folded-away position without a load, and later receive one or more loads.

Once the rear end of the vehicle V is accessible, the transport trolley CT is pushed towards the vehicle V so that the front part PV of its second load support means S2 (see FIG. 11) is penetrating into the vehicle, above its floor PLV. If the second load support means S2 is mounted on telescopic guide ways GLk and solidly connected to lateral parts PLk, the second load support means S2 is translated forward by extending the guide ways GLk (see FIG. 12). Then, when the legs Jk come into contact with the vehicle V, they are forced to fold away backwards parallel to the lateral parts PLk in order to be integrally contained in the space defined by the vertical extension of these lateral parts PLk (see FIG. 13). The folding away of the legs Jk provokes the simultaneous folding of the plates PTk and therefore of wheels Rk, due to the action of the second coupling means MC2. Following this, the folded legs Jk are pushed towards the front of the vehicle V until they come to a stop and the guide ways GLk have at least partially retracted in order to minimize the maximum extension of the transport trolley CT in a longitudinal direction (see FIG. 14). If the transport trolley CT comprises gripping means MP, as illustrated, the gripping means are folded away in the direction of the lateral parts PLk so that they are integrally contained in the space defined by the vertical extension of these lateral parts PLk, if necessary outside the lateral parts PLk. It is to be noted that once the transport trolley CT has arrived in an immobilization position, by preference a predefined position, it can be immobilized by any means known to a person skilled in the art, and for instance thanks to anchoring means defined in the floor PLV of vehicle V.

To proceed with the extraction of transport trolley CT out of the vehicle V, the aforementioned operations are executed in reverse order, by pulling the trolley by its gripping means MP (after they have been straightened out). It is apparent that as soon as the legs Jk are overhanging (outside vehicle V), they will begin to straighten out, which also provokes the automatic straightening out of the plates PTk and therefore of the wheels Rk.

It is to be noted also that if necessary the transport trolley CT can be equipped with immobilization means intended to immobilize it relative to the vehicle V.

It is to be noted also that if the transport trolley CT constitutes a modular element of the platform floor of a utility type automotive vehicle, the height of its legs Jk is adapted to the range of heights at which the floors of these vehicles PLV are located. This height can be variable depending on the envisaged applications.

It is to be noted also, as illustrated in a non-limiting manner in FIGS. 8 and 9, that if one leg Jk comprises two posts Mik, the leg can be equipped with a dampening means MA intended to limit the speed of folding away and deployment. For instance, a damper MA can be used of which one of the extremities is solidly connected to one of the two posts (for instance the first M1k), for instance near its upper extremity (close to a lateral part PLk), while the other extremity is solidly connected to the other post (for instance the second M2k), for instance near its lower extremity.

It is to be noted also, as illustrated in a non-limiting manner in FIGS. 8 and 9, that if the legs Jk comprise two posts Mik, it is preferable for the transport trolley CT to comprise a locking mechanism intended to lock each of its legs Jk at least until they are in the straightened-out position (and therefore ready to support loads). It is also possible to equip the wheels Rk with breaking and/or blocking means (optionally indexing where they are pivotally mounted). It is also possible to equip the transport trolley CT with complementary security means intended to prevent accidental folding during the manipulation.

It is to be noted also that in order to facilitate the forward or rearward translations of the folded-away transport trolley CT, its second load support means S2 and/or its first coupling means MC1 or its frame CD can be equipped, as illustrated in non-limiting manner in FIGS. 10 to 14, with auxiliary rollers RA of which the rolling surface overhangs very slightly in order not to increase in significant manner the occupied space in a vertical direction.

It is to be noted also that in order to facilitate the pivoting of the wheels Rk under load, omni-directional caster wheels can be used, with as a condition the fact that the axis of rotation of the casters must be approximately parallel to the axis of rotation allowing for the lateral inclination of the wheels. By preference, the longitudinal axis of rotation of the wheels is positioned as close as possible to the floor, even almost coincident with the contact zone of the wheel Rk. In addition, the examples illustrated in FIGS. 1 to 6 provide a rolling solution for manipulating the trolley in folded-away position (as in a suitcase), knowing that the wheels Rk are perpendicular to the direction of movement and therefore that it becomes possible to roll over the floor thanks to the casters.

It is to be noted also that the transport trolley CT can comprise, on the one hand, one electric motor (not shown) suitable for driving the rotation of the legs Jk in order to change them from a straightened-out position, suitable for support, to a folded-away position, and vice versa, and, on the other hand, a battery (not shown) suitable for supplying electrical energy to each electric motor. This option is intended for the possible automation of the deployment and folding away of the transport trolley CT.

It is to be noted also that if necessary the transport trolley CT can comprise at least a first electric plug intended to be connected with a second electric supply plug installed in the vehicle V and for instance coupled to the electrical supply circuit of said vehicle.

This first electric plug can be directly connected to one or several electrical devices which are part of the second load support means S2 and/or of the first coupling means MC1 or of the frame CD, such as for instance a battery (in order to recharge, via a low voltage converter (typically 12V or 24V)). For instance, the second electrical supply plug can be installed in a zone of the vehicle V intended to receive the front part PV (or rear PR) of the transport trolley CT. In this case, the first electrical plug can be installed, for instance, on the front part PV of the second load support means S2 in order to be automatically coupled to the second electrical supply plug when its transport trolley CT is in a predefined installation position.

It is to be noted also that the transport trolley CT can be equipped with anchoring or stowage means, such as for instance catches or hooks or rails or slots, intended for anchoring or stowage of loads on its first S1 and/or second S2 load support means.

It is to be noted also that if necessary the vehicle V (and in particular its rear end) can be arranged for receiving at least one transport trolley CT after it has been configured in a folded-away storage condition. In this case, it comprises at least one predefined installation zone, in other words arranged for receiving one transport trolley CT in view of its immobilization. If necessary, the vehicle V can comprise two parallel longitudinal installation zones which are accessed from the rear of the vehicle V, or else one longitudinal installation zone which is accessed from the rear of vehicle V and one transverse installation zone which is accessed from a lateral side of the vehicle.

If necessary, an installation zone can comprise a load stop, or can be defined in a dedicated reinforcement of the floor PLV (in this case the transport trolley CT can define a platform floor). If necessary, an installation zone can comprise guidance means and/or locking means intended to immobilize the gripping means MP in their folded-away position.

The platform floor on which a system of body rails can be integrated can be exploited in different manners, and in particular:
- as conventional load transport upper platform,
- as a floor equipped with dedicated professional arrangements, for instance for a utility vehicle,
- as a floor provided with various types of body equipment such as individual seats, rolling seat, tablet, and similar.

The invention offers several advantages, and in particular:
- the possibility of folding away the transport trolley vertically or horizontally with its wheels remaining in contact with the floor,
- the possibility to fold the transport trolley into a two-wheeled trolley version with the load resting on the floor,
- the possibility of folding/deploying the legs while keeping the load in place,
- the possibility of adding an upper platform (or frame) either in removable version or in sliding version, which is compatible with the possibility of docking or undocking with a vehicle at the height of the rear floor.

The invention is not limited to the embodiments of the transport trolley and the vehicle described above, which are given only as examples, but it encompasses all variants that can be envisaged by a person skilled in the art within the scope of the following claims.

The invention claimed is:

1. A transport trolley comprising a pair of legs, each comprising a lower extremity; a plate rotatably mounted to said lower extremity of each leg to rotate in a transverse direction; at least one wheel rotatably mounted to said plate, and a first load support means coupled to said lower extremities of the legs; wherein the transport trolley further comprises:
   i) first coupling means; said lower extremities of said legs being rotatably mounted in a transverse direction to said first coupling means so that said legs are movable between a straightened-out position and a folded-away position; said plates being rotatably mounted to said first coupling means so that said wheels pivot under load about a longitudinal axis generally parallel to the ground between a straightened-out position and a folded-away position approximately parallel to said folded-away legs,
   ii) second coupling means arranged to force said legs and said wheels to be approximately simultaneously in either their folded-away position or in their straightened-out position, and wherein said wheels pivot under load about a longitudinal axis of rotation generally parallel to the ground;
   iii) two feet associated respectively with said plates and arranged for stabilizing said trolley when said trolley is stationary; wherein said feet are rotatably mounted to said first coupling means so that said feet are movable between a straightened-out position suitable for stabilizing said trolley to a folded-away position approximately parallel to said folded-away legs.

2. The trolley according to claim 1, wherein said second coupling means is arranged to force said plates and said feet to be approximately simultaneously either in their straightened-out position or in their folded-away position.

3. A transport trolley comprising a pair of legs, each comprising a lower extremity; a plate rotatably mounted to said lower extremity of each leg to rotate in a transverse direction; at least one wheel rotatably mounted to said plate, and a first load support means coupled to said lower extremities of the legs; wherein the transport trolley further comprises:
   i) first coupling means; said lower extremities of said legs being rotatably mounted in a transverse direction to said first coupling means so that said legs are movable between a straightened-out position and a folded-away position; said plates being rotatably mounted to said first coupling means so that said wheels pivot under load about a longitudinal axis generally parallel to the ground between a straightened-out position and a folded-away position approximately parallel to said folded-away legs, wherein each plate is coupled to said first coupling means via a Scott-Russel type straightening mechanism; and
   ii) second coupling means arranged to force said legs and said wheels to be approximately simultaneously in either their folded-away position or in their straightened-out position, and wherein said wheels pivot under load about a longitudinal axis of rotation generally parallel to the ground.

4. A transport trolley comprising a pair of legs, each comprising a lower extremity; a plate rotatably mounted to said lower extremity of each leg to rotate in a transverse direction; at least one wheel rotatably mounted to said plate, and a first load support means coupled to said lower extremities of the legs; wherein the transport trolley further comprises:
   i) first coupling means; said lower extremities of said legs being rotatably mounted in a transverse direction to said first coupling means so that said legs are movable between a straightened-out position and a folded-away position; said plates being rotatably mounted to said first coupling means so that said wheels pivot under load about a longitudinal axis generally parallel to the ground between a straightened-out position and a folded-away position approximately parallel to said folded-away legs, and ii) second coupling means arranged to force said legs and said wheels to be approximately simultaneously in either their folded-away position or in their straightened-out position, and wherein said wheels pivot under load about a longitudinal axis of rotation generally parallel to the ground;

wherein said first load support means is rotatably mounted to said first coupling means so that said first load support means is movable between a straightened-out position approximately perpendicular to said legs to a folded-away position approximately parallel to said folded down legs.

5. The trolley according to claim 4, wherein said first coupling means comprises at least two members to which are respectively rotatably mounted said legs and said plates, and in that said first load support means is solidly connected to said plates.

6. The trolley according to claim 4, wherein said first load support means comprises two blades.

7. The trolley according to claim 4, wherein each leg comprises two posts, on the one hand, comprising an upper extremity solidly connected to a corresponding longitudinal part and a lower extremity rotatably coupled to said first coupling means, and, on the other hand, cooperating with said longitudinal part in defining a deformable parallelepiped in which said posts are foldable approximately parallel to said longitudinal part.

8. The trolley according to claim 4, wherein said trolley constitutes a modular element of a platform floor of a vehicle.

9. A vehicle comprising a rear end arranged for receiving at least one transport trolley according to claim 4, after said at least one transport trolley has been configured in a folded-away storage position.

10. The trolley according to claim 4, wherein the trolley comprises two feet associated respectively with said plates and arranged for stabilizing said trolley when said trolley is stationary.

11. The trolley according to claim 10, wherein said first load support means is solidly connected to said feet.

12. The trolley according to claim 4, wherein said second coupling means comprises two crossed axis gear systems, each gear system being coupled to the lower extremity of one of the legs and a connecting rod suitable for pivoting one of said plates.

13. The trolley according to claim 4, wherein said second coupling means comprises a Sarrus structure coupled to the lower extremities of said legs.

14. The trolley according to claim 13, wherein said first load support means is in the form of a U-shaped plate; said first coupling means comprising two hinges each of which comprises a first part solidly connected to the lower extremity of one of said legs and a second part rotatably mounted to said first part and to which is rotatably mounted one extremity of said plate;

said second coupling means comprising two articulations each of which comprises a first part mounted in rotation to the first part of one of the hinges, a second part mounted in rotation to said first part and a third part rotatably mounted to said second part and to which is rotatably mounted one of said plates and another extremity of said plate.

* * * * *